Aug. 8, 1961  D. LLOYD  2,995,701
ELECTROMAGNETIC INSPECTION OF PIPE
Filed Jan. 6, 1959  4 Sheets-Sheet 1
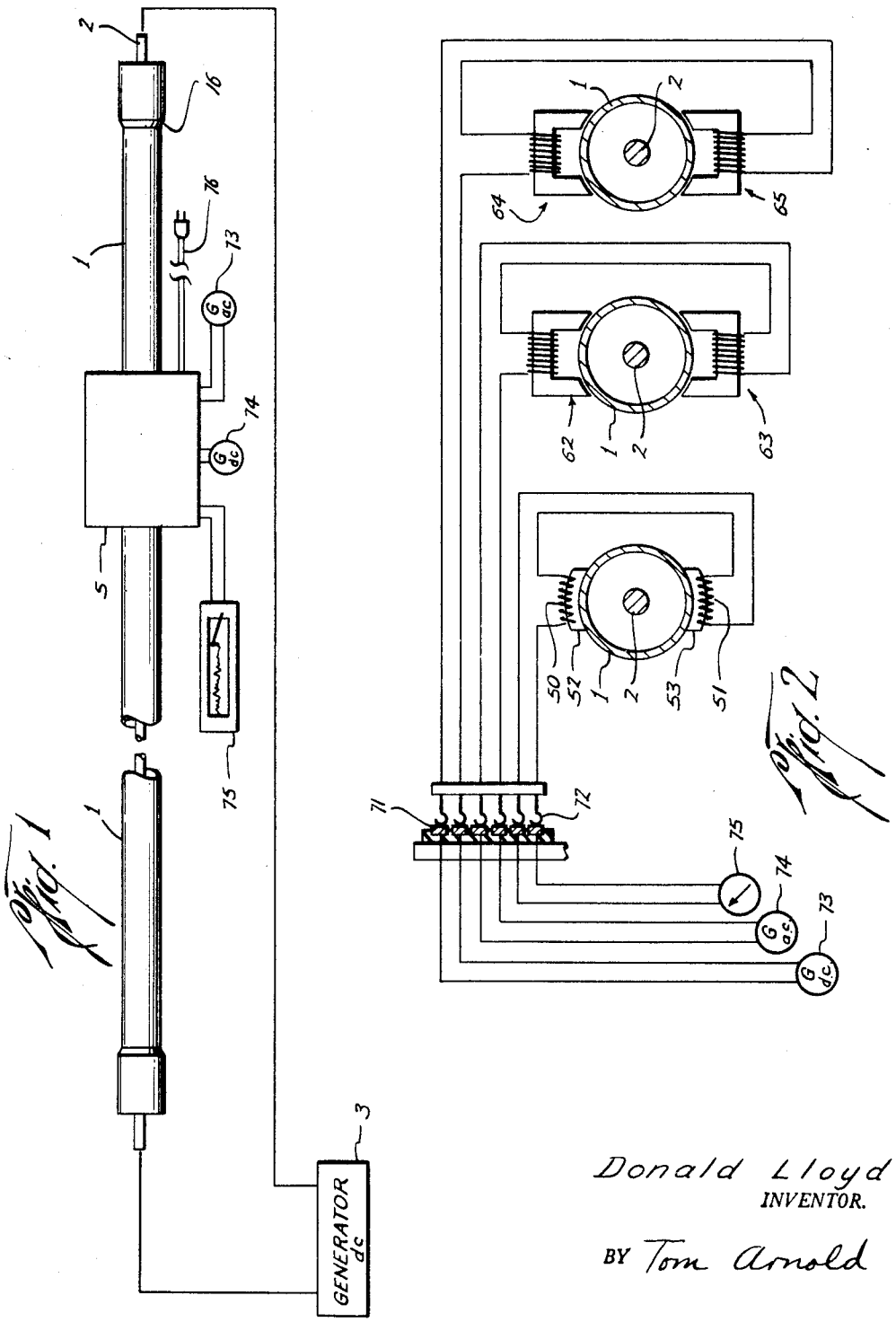
Donald Lloyd
INVENTOR.
BY Tom Arnold
ATTORNEY

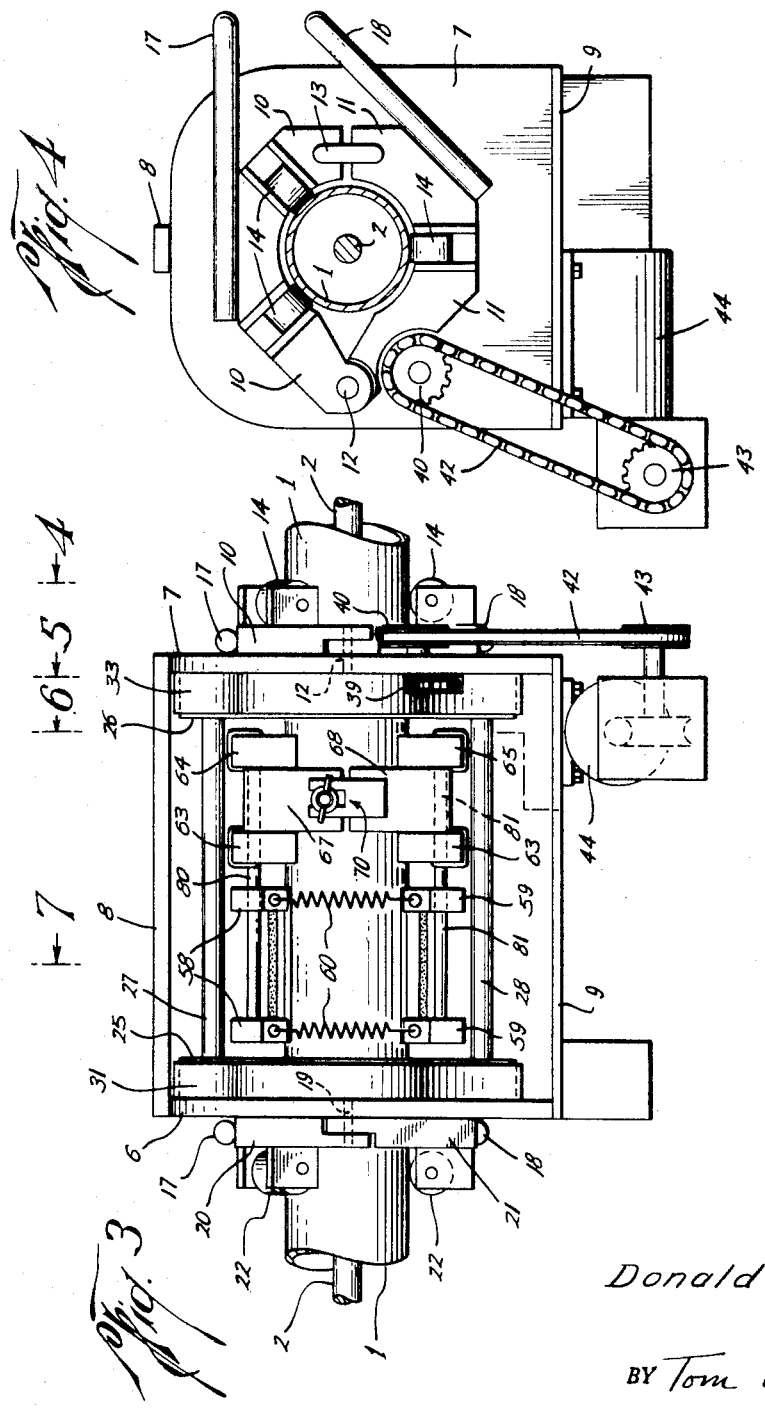

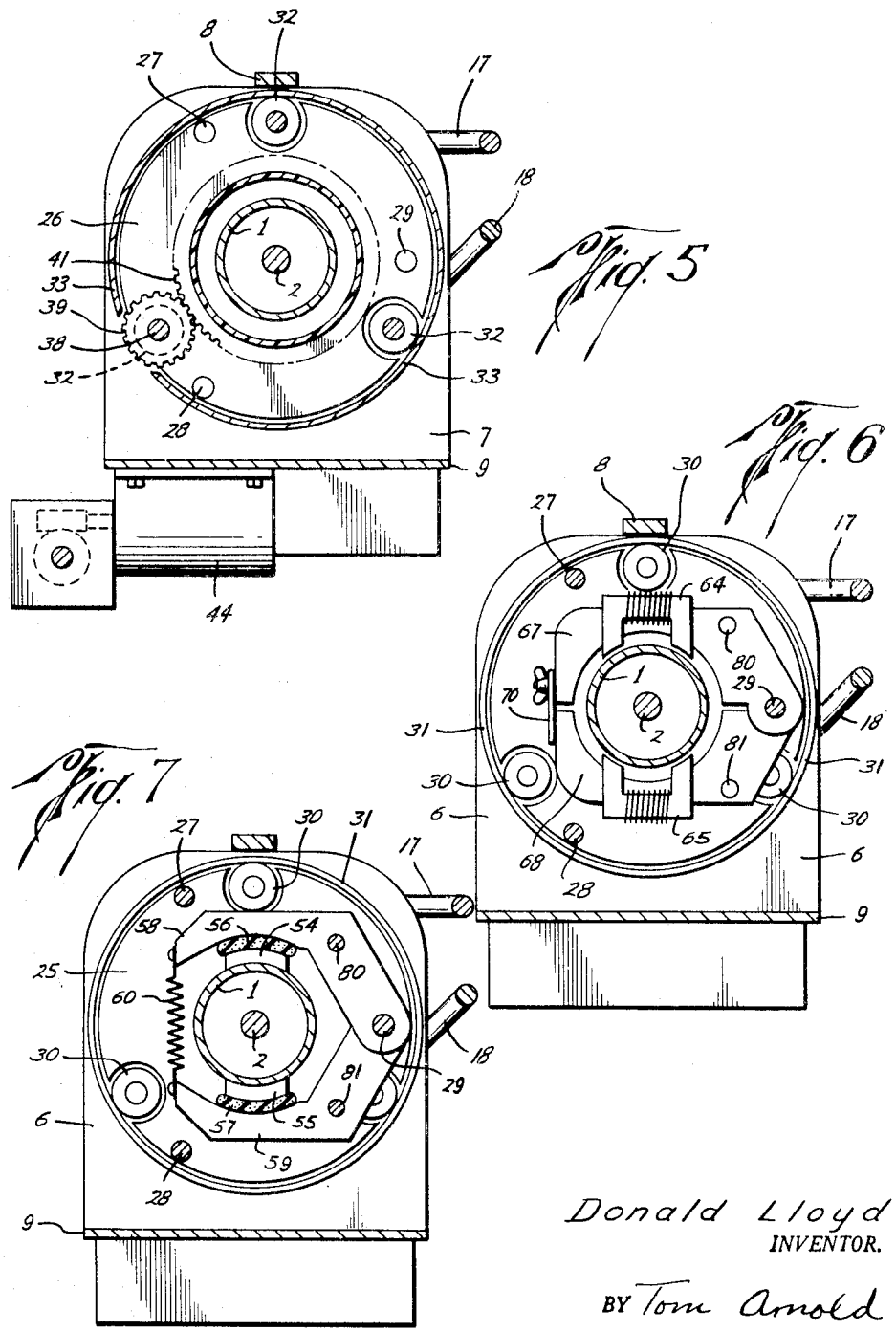

Aug. 8, 1961 D. LLOYD 2,995,701
ELECTROMAGNETIC INSPECTION OF PIPE
Filed Jan. 6, 1959 4 Sheets-Sheet 4

Donald Lloyd
INVENTOR.

BY Tom Arnold

ATTORNEY

United States Patent Office 2,995,701
Patented Aug. 8, 1961

2,995,701
ELECTROMAGNETIC INSPECTION OF PIPE
Donald Lloyd, Houston, Tex., assignor to Tuboscope Company, Houston, Tex., a corporation of Delaware
Filed Jan. 6, 1959, Ser. No. 785,229
5 Claims. (Cl. 324—37)

This invention relates to electromagnetic inspection of ferromagnetic pipe, and more particularly to novel and improved methods of inspection utilizing to advantage a novel pattern of magnetizing steps and apparatus therefor.

In United States Patent 2,650,344 issued to me August 25, 1953, and United States Patent 2,685,672 issued to Messrs. Price and Wood August 3, 1954, there is disclosed the general method, and means for practicing the method, of inspecting pipe by magnetizing the pipe and while it is magnetized, scanning the surface of the pipe with a detector coil in which variations in flux at the pipe surface induces voltages which are indicative of cracks, pits, and other defects and discontinuities in the pipe wall.

The methods there taught and taught in many other references, contemplate the active magnetization of the pipe during the scanning operation, because the detection from harmless mill scale and other random pickup "noise" is sufficiently large to hide the signal of a defect when pipe is under only residual magnetism (as distinguished from active magnetization) when scanned. Thus it has heretofore been necessary, if a commercially satisfactory quality of inspection is to be performed, to have the pipe under active magnetization during the scanning.

It has also been heretofore known that the pipe might be magnetized by surrounding it with magnetizing coils as disclosed in the above mentioned patents, thus producing a flux pattern in the pipe wall substantially parallel to the axis of the pipe, and it has also been known that if electric current is passed lengthwise through the pipe walls from one end to the other, a flux is generated in the pipe of a pattern circumferential of the pipe.

But in commercial operations on oil well drill pipe and casing for example, such large currents (on the order of 1000 amperes) are required to be passed through the pipe walls as to produce severe danger of "burning" the pipe at its contacts with the electric current source, and most pipe owners forbid the inspecting service companies from magnetizing their pipe by passing large currents therethrough. And magnetizing by coils surrounding pipe produces a flux pattern parallel to all cracks in a plane longitudinal of the pipe thus making detection of longitudinal flaws difficult and as to small defects impossible.

Moreover, continuous active magnetization by passing current through a conductor inside the pipe demands, particularly with large sizes of pipe such as are used in the oil fields, very large quantities of electric power to supply enough magnetism to permit efficient flaw detection continuously for the periods of time it takes to scan a section of pipe with a detector coil.

It may be further mentioned that in conventional operations, the response to external flaws frequently runs on the order of twenty times larger than the response to internal defects of the same size, and circuits which will handle and indicate the large signal from an external defect lose the small signal from internal defects; and those that amplify the induced signal enough to indicate the internal defect are overloaded by the signal from an external defect with further complications resulting therefrom.

Accordingly, an object of this invention is to provide a method, and apparatus for the practice thereof, of magnetically inspecting pipe for defects wherein the response to internal and external flaws of the same size is of the same order of magnitude, as for example the one being no more than about two or three times larger than the other.

Another object of this invention is to provide a method, and apparatus for the practice thereof, of electromagnetically inspecting pipe, including particularly a method of magnetizing pipe for scanning with a detector coil, which demands small amounts of power for magnetizing and is therefore economical.

Still another object is to provide a method of pipe inspection wherein current is not passed through the pipe itself and wherein a circumferential flux pattern may nevertheless be obtained from which longitudinal flaws may most readily be detected.

A further object of this invention is to provide a method of pipe inspection, and apparatus for the practice thereof, wherein the noise level is so reduced that the pipe may be magnetized with a one shot surge of magnetic flux and then inspected through detection of residual magnetism without necessitating the continuous application of magnetizing forces.

Still another object of this invention is to provide a method of and apparatus for pipe inspection wherein defects at or near the internal surface of the pipe may be detected and evaluated along with defects at and near the external surface of the pipe, all in the presence of surface mill scale, rust and other noise producing surface variations not materially affecting basic pipe strength or quality.

Still other objects will be apparent from the following description and accompanying drawings. These objects are accomplished in accordance with this invention by magnetizing the pipe with a surge of electric current passed down an electric conductor within the pipe thus producing a flux pattern circumferential of the pipe, thereafter modifying the pattern of magnetism near the external surface of the pipe with a scanning magnet and then scanning the pipe with a detector coil.

In the drawings, FIGURE 1 schematically illustrates a length of pipe fitted with means for providing a surge magnetization as contemplated by this invention. In FIGURE 1 there is also a schematic illustration of a scanning carriage and indicator which may be used in the practice of this invention.

FIGURE 2 is a schematic diagram of a circuit used in the practice of the invention.

FIGURE 3 is an elevational view of one carriage which works well in the practice of this invention.

FIGURES 4, 5, 6 and 7 are all various elevational sections of the carriage of FIGURE 3 giving further details thereof.

Figure 8:
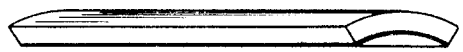
FIGURE 8 is a pictorial view of a scanning coil shoe such as may be used with the invention.

The first magnetizing step of the invention is best understood by reference to FIGURE 1, wherein the pipe to be inspected is illustrated at 1. Within the pipe 1 may be positioned an electricity conducting rod 2, both ends of which are connected across a source of direct cur rent 3.

The source 3 may be an ordinary direct current generator or a bank of batteries. A small D.C. generator may be used in conjunction with a bank of condensers (not shown) such that the generator can charge the condensers which are then connected to the conducting rod 2.

In any event the D.C. source 3 is able to supply a large surge of current through the rod 2, preferably enough to saturate the pipe 1 with magnetic flux for a short period.

After the pipe 1 has been subjected to magnetism, the source 3 is disconnected leaving the pipe with whatever residual magnetism it will retain. Note also, that the flux pattern produced by this method of magnetism is circumferential of the pipe, perpendicular to cracks and flaws longitudinal of the pipe.

Means are provided to scan the surface of the pipe 1 as indicated in the above cited references, and such means are most conveniently housed in a carriage 5 schematically illustrated in FIGURE 1, and one embodiment of which is illustrated in some detail in FIGURES 3, 4, 5, 6 and 7.

The carriage body or chassis illustrated comprises two spaced apart end plates 6 and 7 (FIGURE 3), secured together at the top by a bar 8 and at the bottom by a bottom plate 9. Each of the two end plates 6 and 7 has a large opening therein through which the pipe to be inspected, including any upsets in the surface thereof, can freely pass.

On the outside of the end plate 7 are mounted two hinged wheel supporting members 10 and 11 hingedly secured at 12 to the end plate 7 and capable of being latched into the closed position illustrated in FIGURE 4 by the latch 13. The wheel supports 10 and 11 in closed position have themselves an opening therein, sufficient to pass the pipe 1 as seen in FIGURE 4. Rotatably mounted upon the wheel supports 10 and 11 are three wheels 14, spaced around the circumference of the pipe 1 and aligned to bear on the pipe 1 and to permit the carriage free movement along the length of the pipe. When an upset (as at 16 in FIGURE 1) is reached, the latch 13 is unfastened, and the wheel support members 10 and 11 are parted to permit movement of the carriage over the upset.

Conveniently handles 17 and 18 may be secured respectively to wheel support members 10 and 11 to facilitate this handling of the carriage.

On the outside of the end plate 6, by hinge 19, are mounted wheel support members 20 and 21, carrying wheels 22. The handles 17 and 18 extend the length of the carriage from the right hand end in FIGURE 3, to the left hand end, as seen in FIGURE 6, and are connected respectively to the wheel support members 20 and 21 at the left hand end.

Thus it is apparent that the carriage may be mounted upon pipe 1 and moved along the length thereof riding on the wheels 14 and 22; or phrased conversely, the pipe may be moved through the carriage. The point of course is to effect relative movement of the carriage with respect to the pipe regardless of which is moved relative to the earth.

Since scanning of the entire pipe surface with scanning coils is desired, means are also provided for effecting relative movement of the scanning coils carried by the carriage with respect to the pipe in a direction circumferential of the pipe, so that the combined longitudinal or axial movement and circumferential movement effects a coil-relative-to-pipe movement of a helical form around the pipe permitting scanning of the entire pipe surface.

Accordingly, the preferred carriage illustrated includes a rotating frame comprising a rotating plate 25 (FIGURE 7), a second rotating plate 26 (FIGURE 5), and three transverse rods 27, 28 and 29 securing the two rotating plates 25 and 26 one to the other.

The rotating plates 25 (FIGURE 7) carries thereon three wheels 30 fitted to run in a race 31 mounted on the end plate 6. The rotating plate 26 carries thereon three wheels 32 fitted to run in a race 33 mounted on the end plate 7. It might be noted that in FIGURE 5, one of the wheels 32 happens to be located behind a pinion hereafter to be described but the wheel and pinion are not connected one to the other.

It is thus seen that the rotating frame is rotatable in the races 31 and 33. Means are provided for producing this rotation with respect to the carriage body.

In the end plate 7 is mounted an axle 38, having on one end thereof a pinion 39 and on the other a sprocket 40. Mounted on the rotating plate 26 is an annular gear 41 positioned to engagedly cooperate with the pinion 39, such that when the pinion 39 is rotated, the annular gear 41 and the entire rotating frame with it, rotates with respect to the carriage body.

The sprocket 40 is driven by a chain 42, which is linked to a drive sprocket 43. The drive sprocket 43 is driven through appropriate gearing from an electric motor 44.

The carriage structure described is merely one way to effect the mounting of scanning coils and other parts hereafter described, so that they may be caused to scan the surface of the pipe.

While one scanning coil is enough, in the structure illustrated two scanning coils are used. They are illustrated schematically in FIGURE 2 as coils 50 and 51 wound upon cores 52 and 53 respectively. In FIGURE 7 the coils and cores are not shown as such, but they are located within the coil shoes 54 and 55.

The coil shoes 54 and 55 being somewhat elongated as indicated by the pictorial view thereof in FIGURE 8, the shoe 54 is mounted through resilient pad 56 on two float arms 58 (FIGURE 3) which are hinged to the rod 29 (FIGURE 7), and the shoe 55 is mounted through resilient pad 57 on two other float arms 59 (FIGURE 3) which are hinged to the rod 29 (FIGURE 7), the float arms 58 extending to one side of the pipe 1, while the float arms 59 extend to the other side of the pipe 1, thus permitting the two coil shoes 54 and 55 to be positioned diametrically-of-the-pipe opposite each other.

The unhinged ends of the float arms 58 are detachably secured to the unhinged ends of the float arms 59 by springs 60 which resiliently urge the coil shoes 54 and 55 into contact with pipe 1.

As is explained hereafter, this invention contemplates the scanning of the surface of the pipe 1 with magnets which are schematically illustrated in FIGURE 2 as A.C. magnets 62 and 63, and D.C. magnets 64 and 65. These magnets are also mounted on the rotating frame of the carriage in pairs diametrically-of-the-pipe opposite each other as seen in FIGURES 2, 3 and 6. In FIGURE 3 may be seen the ends of a magnet mounting arm 67 carrying on one side thereof D.C. magnet 64 and on the other side thereof A.C. magnet 62. On the opposite side of the pipe is seen magnet mounting arm 68 carrying on one side thereof D.C. magnet 65 and on the other side thereof A.C. magnet 63.

As seen in FIGURE 6, the magnet mounting arms 67 and 68 are hinged to the rod 29 on one side of the pipe, and on the other side of the pipe may be latched together by the latch 70. The latch 70 is adapted to rigidly position the ends of the arms 67 and 68 which it connects, so that the magnets carried by the arms 67 and 68 may be held in a predetermined position spaced sufficiently apart so that when the pipe 1 is centered between the arms 67 and 68, the magnets are at a predetermined distance from the pipe 1.

Means are of course provided to hold the arms 67 and 68 against gravity so that the magnets they carry do not drag upon the pipe. Such means in the embodiment illustrated are short rod 80 which secures magnet support arm 67 to the detector coil float arms 58, and short rod 81 which secures magnet support arm 68 to detector coil float arms 59. As heretofore indicated, the detector coil shoes 54 and 55 do drag upon the pipe 1, thus positioning the arms 58 and 59 which support them at positions equidistant from the pipe 1. Since arms 58 and 59 are secured respectively to arms 67 and 68 by the short rods 80 and 81, the arms 67 and 68 are thereby positioned equi-distant from the pipe 1, holding the magnets 62, 63, 64 and 65 in a predetermined spaced relationship with respect to the pipe 1.

FIGURE 2 illustrates the circuit schematically, including slip rings 71 which are carried by the end plate 6 within the race 31, and cooperate with brushes 72 carried by the rotating plate 25.

Through the slip rings 71 and brushes 72, the coils of electromagnets 64 and 65 are connected to a source of direct current indicated as D.C. generator 73, the coils of electromagnets 62 and 63 are connected to a source of alternating current indicated as A.C. generator 74, and the detector or scanning coils are connected to a strip chart or other conventional indicator 75.

As schematically illustrated in FIGURE 1, power lines 76 are provided to connect the rotating motor 44 to a source of power. While various means may be used to hold the carriage body against rotation, the body is conveniently constructed with the power lines 76 suspended from the normally lower side of the body, and with the motor 44 positioned at the normally lower side, and with the lines from the generators 73 and 74 and indicator 75 also connected at the normally lower side. Thus the weight of these depending lines and of the motor, function to hold the side to which they are connected downward, preventing the carriage body from itself rotating when the motor 44 is energized.

An alternative practice of the invention uses a carriage without rotating frame, moved relative of the pipe 1 in a longitudinal direction while the pipe is rotated within the frame, thus producing the same helical path relative motion between coils and pipe surface as that effected by moving the carriage illustrated longitudinal of the pipe with the coils rotating around the pipe. Still another alternative is to hold coils and magnets stationary and rotate the pipe while moving it longitudinally past the coils and magnets, all these alternatives producing the desired helical scanning path permitting complete coverage of the pipe surface.

Consider now the steps which constitute the method invention.

As aforesaid, the pipe 1 may be magnetized by a surge of electric unidirectional current being passed through the rod 2. Residual magnetism left in the pipe wall is circumferential, the residual magnetism in the pipe wall being substantially as great at the outside surface of the pipe wall as on the inside surface.

Coils are passed over the pipe surface, as by the use of the equipment previously described. Flaws in the pipe cause discontinuities in the magnetic flux path in the pipe wall, and thus cause concentrations of flux emanating from the pipe surface immediately around a flaw in the pipe wall.

Flaws which are the same distance from the outside wall and are of the same size and character will produce the same flux concentration. Thus a detector coil passed over the surface of the pipe will have induced therein a voltage which is indicative of the flaw, which voltage may be indicated by a strip chart indicator 75 or other such indicator. But the amplitude of the indication is not translatable into flaw size unless the location of the flaw is known, since a flaw near the outside surface produces a larger response than one near the inside surface and thus further removed from the detector coils.

Moreover, responses to outside flaws are of an order of magnitude twenty times greater than responses to comparable flaws at the inside surface of the pipe. If the signal is of amplitude to give good indications on a chart of the large outside flaws, inside flaws are lost in the noise response. If the signal is amplified to give good indication of inside flaws, outside flaws overload the circuit and cause other related problems.

View it another way. Most pipe used in the oil fields is rough of surface, and has mill scale, rust and the like on the outside surface where response is most accentuated. Responses to these surface variations which do not represent flaws or weakness in the pipe are frequently of the same order magnitude as responses to true defects located away from the outside surface of the pipe. This being so, the "noise" response from mill scale and the like frequently obscures the information sought about true defects within the pipe wall proper.

In accordance with invention, residual magnetism rather than active magnetism is used for the scanning operation; and the pattern of flux in the pipe wall is deliberately modified to minimize the undesirable noise responses, while permitting still the detection and evaluation of true flaws.

Thus means are provided to scan, ahead of the detector coil scanning, the surface of the pipe with a unidirectional (as distinguished from alternating) magnetic flux. This may take the form of the electromagnets 64 and 65 which comprise cores surrounded by coils excited with direct current; or it may take the form of permanent magnets of comparable shape and location.

The size, location, strength, and speed of movement of the magnets 64 and 65, strangely, are of critical importance to successful accomplishment of the desired ends of gaining marked improvement in the signal to noise ratio and rendering responses to internal defects of the same order of magnitude as responses to true external defects.

In work on typical oil field seamless pipe, applicant has obtained excellent results when the magnets 64 and 65 and the pick up shoes 54 and 55 are moved around the pipe with a pipe surface velocity of about 45 linear feet per minute, when the core or yoke of the magnets 64 and 65 have a span less than one quarter of the circumference of the pipe, and when the direction of magnetism they induce in the pipe is opposite the residual magnetism left from the original pipe magnetizing surge.

Further it has been found that the magnets 64 and 65 are preferably spaced from the pipe surface about ½ inch. Closer spacing reduces the intelligence signal from flaws, whereas further spacing results in a greater failure to reduce noise response and response to such things as external hammer marks on the pipe which are of no interest in the subject inspection.

The flux strength of the magnets 64 and 65 must obviously not be so great as to completely demagnetize the pipe wall, but must be great enough to modify the residual flux pattern in the outside of the pipe wall. Using a given magnet core with a span equal to about ¼ the pipe circumference and spaced about half an inch from the pipe, curves such as are illustrated in FIGURE 9 can easily be plotted to determine the optimum magnet strength consistent with the variables of pipe size and material, magnet core size, etc.

Figure 9:
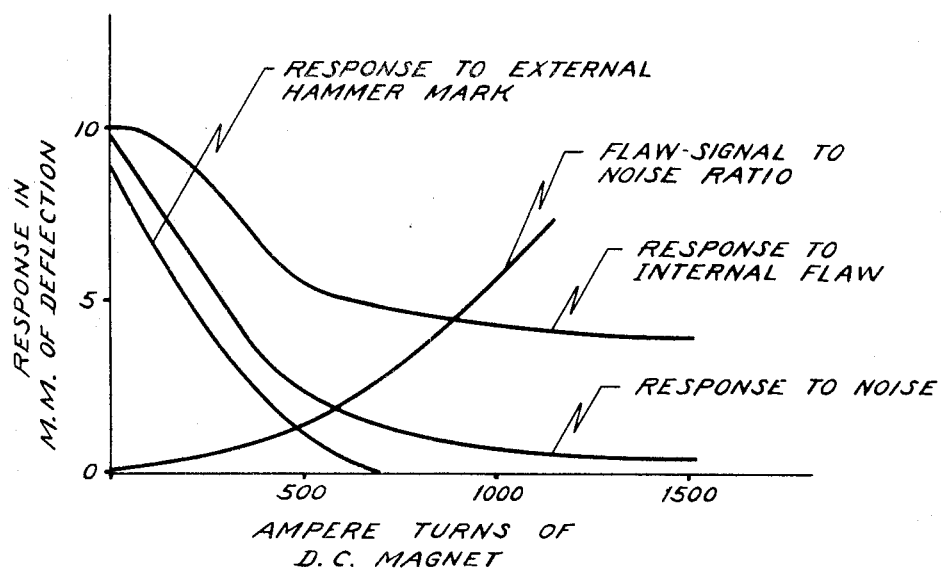
FIGURE 9 is a plot of response to internal flaw, to noise, and to a hammer mark, and of the signal to noise ratio, which may be derived from the use of this invention with varying magnetomotive force in magnets.

In deriving FIGURE 9, a joint of drill pipe with a known internal flaw and external hammer mark was used for test purposes, and the amperes through the magnet coil were varied to determine at what magnet power good flaw-signal to noise ratio could be obtained. The response to the external hammer mark is seen to drop off to zero and other noise response to low values much more rapidly than the response to the internal defect. Since response to external defects is also decreased as the magnet strength increases, and may be eliminated by excessive magnet strength, the prudent choice of operating range is at a strength about corresponding to the point 500 on the FIGURE 9 plot.

Alternative to using a direct current electromagnet or permanent magnet such as magnets 64 and 65, or in addition to such magnets, there may be used electromagnets such as 62 and 63 excited by an alternating current of frequency properly selected to reduce the external noise to a workable level. For example, 2000 c.p.s. has been found a practical frequency for this purpose. The A.C. electromagnets' dimensions, spacing, and flux strength may be chosen consistently with the recitation concerning the D.C. magnets.

The magnets 62, 63, 64 and 65 of course lead the scanning coils 50 and 51 in their travel over the pipe, and the magnets are preferably spaced from the scanning coils by enough distance to prevent direct induction from the magnets into the scanning coils.

Modifications may be made in the invention as herein particularly described, without departure from the scope of the invention. For example, the carriage apparatus may be used to inspect pipe, tubing and also solid cylindrical shafts which can be magnetized by means other than the rod 2. Accordingly, the foregoing description is to be construed as illustrative only and not as a limitation upon the invention as defined in the following claims.

I claim:

1. A method of inspecting ferromagnetic pipe for flaws and defects and discontinuities in the walls thereof comprising the steps of
passing an electrical conductor through said pipe;
thereafter passing through said conductor an electrical current of amount sufficient to significantly magnetize the pipe surrounding said conductor and then terminating the passage of substantial electric current through said conductor, whereby said pipe is left with a significant amount of residual magnetism;
passing a magnet over the outside surface of said pipe so that a continuous flux passing unidirectionally from one pole to the other of the magnet is caused to penetrate the outside surface of said pipe as the magnet passes over the pipe surface;
thereafter scanning the outside surface of said pipe with a detector coil whereby variations in magnetic flux remaining at the surface of the pipe induce voltage in said coil; and
indicating the voltage induced in said coil.

2. The method defined in claim 1 characterized by the additional step taken after the original magnetization of the pipe and before the scanning with a detector coil,
of passing an electromagnet over the outside surface of said pipe so that magnetic flux from said magnet is caused to penetrate the outside surface of said pipe as the magnet passes over the pipe surface,
said electromagnet being energized with an alternating current.

3. The method defined in claim 1 wherein the magnet supplies a continuous flux passing unidirectionally from one pole to the other of the magnet in substantially the same direction as said residual magnetism.

4. Apparatus for the magnetic inspection of magnetized pipe or the like comprising
a chassis adapted to be moved with respect to said pipe in a direction longitudinal of said pipe;
a frame carried by said chassis and mounted to be rotatable with respect to and around said pipe;
means for rotating said frame with respect to said pipe while said chassis is being moved longitudinal of said pipe whereby parts carried by said rotating frame describe a helical path around said pipe;
a magnet carried by said rotatable frame of such size and in such position as to induce significant magnetic flux into a segment of the circumference of said pipe less than 180 degrees;
a detector coil carried by said rotatable frame and adapted to be positioned adjacent the surface of said pipe whereby the movement of said chassis longitudinal with respect to said pipe and the rotation of said frame around said pipe causes said coil to scan the surface of said pipe;
said coil being adapted for connection to indicator means by which voltages in said coil may be indicated.

5. The invention defined in claim 4 characterized by the addition to said rotating frame of a second magnet of such size and position as to induce significant magnetic flux into a segment of the circumference of said pipe less than 180 degrees, one of said two magnets inducing an alternating magnetic flux and the other a unidirectional magnetic flux into said pipe.

References Cited in the file of this patent

UNITED STATES PATENTS

| | | |
|---|---|---|
| 2,218,784 | Billstein | Oct. 22, 1940 |
| 2,685,672 | Price et al. | Aug. 3, 1954 |
| 2,881,387 | Wood | Apr. 7, 1959 |